(12) United States Patent
Yang et al.

(10) Patent No.: US 12,133,232 B2
(45) Date of Patent: Oct. 29, 2024

(54) ENHANCED CONFIGURED GRANTS

(71) Applicant: Apple Inc., Cupertino, CA (US)

(72) Inventors: Weidong Yang, San Diego, CA (US);
Arjun Bharadwaj, Sunnyvale, CA (US); Yushu Zhang, Beijing (CN); Dawei Zhang, Saratoga, CA (US); Haitong Sun, Irvine, CA (US); Chunhai Yao, Beijing (CN); Hong He, Cupertino, CA (US); Chunxuan Ye, San Diego, CA (US); Oghenekome Oteri, San Diego, CA (US); Sigen Ye, Whitehouse Station, NJ (US); Wei Zeng, San Diego, CA (US); Ralf Rossbach, Munich (DE)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 17/442,117

(22) PCT Filed: Aug. 5, 2020

(86) PCT No.: PCT/CN2020/107030
§ 371 (c)(1),
(2) Date: Sep. 22, 2021

(87) PCT Pub. No.: WO2022/027294
PCT Pub. Date: Feb. 10, 2022

(65) Prior Publication Data
US 2022/0304042 A1 Sep. 22, 2022

(51) Int. Cl.
*H04W 72/23* (2023.01)
*H04W 72/1268* (2023.01)

(52) U.S. Cl.
CPC ....... *H04W 72/23* (2023.01); *H04W 72/1268* (2013.01)

(58) Field of Classification Search
CPC .......................... H04W 72/23; H04W 72/1268
See application file for complete search history.

(56) References Cited

U.S. PATENT DOCUMENTS

| | | | |
|---|---|---|---|
| 2016/0050634 A1* | 2/2016 | Seok | H04W 52/146 370/338 |
| 2020/0214031 A1* | 7/2020 | Chen | H04W 72/23 |
| 2020/0220693 A1 | 7/2020 | Babaei | |

FOREIGN PATENT DOCUMENTS

| | | |
|---|---|---|
| CN | 106233649 A | 12/2016 |
| CN | 108702239 A | 10/2018 |

(Continued)

OTHER PUBLICATIONS

International Search Report for PCT Patent Application No. PCT/CN2020/107030; mailed Aug. 5, 2020.

(Continued)

*Primary Examiner* — Natasha W Cosme
(74) *Attorney, Agent, or Firm* — Kowert, Hood, Munyon, Rankin & Goetzel, P.C.

(57) ABSTRACT

Improved configured grants (CGs) may include the designation of a footprint corresponding to uplink transmission of a UE, with the footprint at least partially defined by the occupied transmission time, occupied transmission frequency, and transmission power. The footprint may be adjustable and/or selectable by the UE according to the current traffic needs of the UE and within limits set for the footprint via prior signaling from the base station to the UE. The UE may indicate the actual footprint parameters/values for the UE's uplink data transmissions by transmitting CG uplink control information (CG-UCI) inclusive of the actual footprint values to the base station. The UE may transmit the CG-UCI over resources configured according to additional parameter values received via the prior signaling from the base station. The UE may further transmit uplink data on (Continued)

resources configured according to the actual footprint values.

20 Claims, 9 Drawing Sheets

(56) References Cited

FOREIGN PATENT DOCUMENTS

WO      2014098358 A1    6/2014
WO      2020/033711      2/2020

OTHER PUBLICATIONS

3GPP 3rd Generation Partnership Project: Technical Specification Group Radio Access Network; NR; Physical layer procedures for data (Release 15) 3GPP TS 38.214 V15.2.0; Jun. 30, 2018.
1 Extended European Search Report EP Patent Application No. 20948182.9; Jul. 4, 2023.

\* cited by examiner

ENHANCED CONFIGURED GRANTS

FIELD OF THE INVENTION

The present application relates to wireless communications, and more particularly to providing configured grants in wireless communications, e.g. 3GPP NR communications.

PRIORITY CLAIM INFORMATION

This application is a U.S. National Stage application of International Application No. PCT/CN2020/107030, filed Aug. 5, 2020, titled "Enhanced Configured Grants", which is hereby incorporated by reference in its entirety.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A proposed telecommunications standard moving beyond the International Mobile Telecommunications-Advanced (IMT-Advanced) Standards is 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

3GPP LTE/NR defines a number of downlink (DL) physical channels, categorized as transport or control channels, to carry information blocks received from the MAC and higher layers. 3GPP LTE/NR also defines physical layer channels for the uplink (UL). The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information (DCI) message. For example, the DCI may include a transmission configuration indication (TCI) relating to beamforming, with the TCI including configurations such as quasi-co-located (QCL) relationships between the downlink reference signals (DL-RSs) in one Channel State Information RS (CSI-RS) set and the PDSCH Demodulation Reference Signal (DMRS) ports. Each TCI state can contain parameters for configuring a QCL relationship between one or two downlink reference signals and the DMRS ports of the PDSCH, the DMRS port of PDCCH or the CSI-RS port(s) of a CSI-RS resource. Multiple PDCCHs can be transmitted in the same subframe using Control Channel Elements (CCE), each of which is a set of resource elements known as Resource Element Groups (REG). The PDCCH can employ quadrature phase-shift keying (QPSK) modulation, with a specified number (e.g. four) of QPSK symbols mapped to each REG. Furthermore, a specified number (e.g. 1, 2, 4, or 8) of CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the base station (e.g. eNB or gNB). The base station uses the uplink scheduling grant (e.g. in DCI) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

An important aspect of wireless data transmission is scheduling. Generally, in communications between a UE device and a wireless network, scheduling is used to designate time slots for uplink communications transmitted by the UE device to the base station. For uplink communications, the UE may first make a scheduling request to the base station. In response, the base station may respond with an uplink grant sent to the UE, granting the UE permission to transmit uplink data. In most cases, scheduling is fully dynamic. In a downlink direction, resources are assigned when data is available. For data to be sent in the uplink direction, the UE dynamically requests transmission opportunities whenever data arrives in the UE's uplink buffer. Information about data being sent in the downlink direction, and uplink transmission opportunities are carried in the radio layer control channel, which is sent at the beginning of each subframe. While dynamic scheduling is efficient for infrequent and bandwidth consuming data transmissions, which may result in large data bursts (e.g. web surfing, video streaming, emails), it is less suited for real time streaming applications such as voice calls. In the latter cases, data is sent in short bursts at regular intervals. If the data rate of the stream is very low, as is the case for voice calls, the overhead of the scheduling messages can become very high, as only little data is sent for each scheduling message.

One solution to this issue has been semi-persistent scheduling (SPS). Instead of scheduling each uplink or downlink transmission, a transmission pattern is defined instead of single opportunities. This significantly reduces the scheduling assignment overhead. During silence periods, the wireless voice CODECs in UEs stop transmitting voice data, and only send silence description information with much longer time intervals in between. During those times of silence the persistent scheduling can be switched-off. In the uplink, the SPS grant scheme is implicitly canceled if no data is sent for a network-configured number of empty uplink transmission opportunities. In downlink direction, SPS is canceled with an RRC (Radio Resource Control) message.

With SPS, the base station provides to the UE a predetermined schedule of periodic time slots in which the UE may perform uplink communications. This allows the UE to generate uplink transmissions to the base station without the overhead of scheduling requests and specific (dynamic) uplink grants. Thus, when a base station configures SPS radio resources, a mobile handset can employ the periodic resources, without an additional scheduling request procedure. When the device has transmit data in its buffer, it can transmit that data via the next already configured periodic resource. However, since SPS configuration is implemented on a per-device basis, when the device does not need periodic resources, for example having to transmit data only when specific events occur, SPS resources unemployed by the device become unused and thus wasted. To reduce such waste of periodically allocated resources, multiple devices may be configured to share the periodic resources through what is referred to as a configured grant (CG). A configured grant, originally based on the SPS feature, and allows the base station to allocate configured grant resources to multiple devices, which may utilize the resources as needed, for example when they have data to transmit. By assigning the configured grant resources, the network eliminates the packet transmission delay for a scheduling request procedure while also increasing the utilization ratio of allocated periodic radio resources. However, for certain traffic conditions, current implementations of configured grants may be inefficient. Thus, improvements in the field are desired.

Other corresponding issues related to the prior art will become apparent to one skilled in the art after comparing such prior art with the disclosed embodiments as described herein.

SUMMARY OF THE INVENTION

Embodiments are presented herein of, inter alia, of methods for implementing improved configured grants (CGs) in wireless communications, for example in 3GPP New Radio (NR) communications. Embodiments are further presented herein for wireless communication systems containing user equipment (UE) devices and/or base stations communicating with each other within the wireless communication systems.

In order to improve CGs, the footprint of an uplink transmission of a UE may be at least partially defined by the occupied transmission time, the occupied transmission frequency and the transmission power. This footprint may be dynamically adjustable/selectable by the UE according to the current traffic needs of the UE and within limits set for the footprint via prior signaling from the base station to the UE. The UE may indicate the actual footprint parameters/values for the UE's uplink data transmissions to the base station by transmitting CG uplink control information (CG-UCI) inclusive of the actual footprint values to the base station.

Accordingly, a device may receive, from a base station, a first set of values corresponding to first transmission parameters used to at least partially configure resources for uplink data transmissions (e.g. PUSCH transmission) of a device, and may further receive from the base station a second set of values corresponding to second transmission parameters used to at least partially configure resources for uplink control information transmissions (e.g. CG-UCI transmission) of the device. The device may determine, based at least on current wireless traffic needs of the device and further based on the first set of values, a third set of values corresponding to the first transmission parameters, and transmit uplink control information (e.g. CG-UCI) comprising at least the third set of values to the base station on resources configured using at least the second set of values.

The device may transmit uplink data (e.g. PUSCH) to the base station on resources configured using at least the third set of values. The first transmission parameters may be used to define an uplink transmission footprint of the device, and may include transmission duration, transmission power, transmission frequency, and modulation coding scheme level. Accordingly, the first set of values may include ranges/limits corresponding to the above referenced parameters, including a maximum transmission duration, maximum transmission power, modulation coding scheme level range and/or maximum occupied frequency. The third set of values may correspondingly include transmission duration of each repetition, number of repetitions, modulation coding scheme level, occupied frequency, and/or cyclic redundancy check bits masked by the device. The second set of values may be used by the device to define/configure resources on which the device may transmit the UCI (which includes at least the third set of values), and may include modulation order, coding rate, time and frequency resource elements, and/or demodulation reference signal configuration.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and claims.

Figure 1:
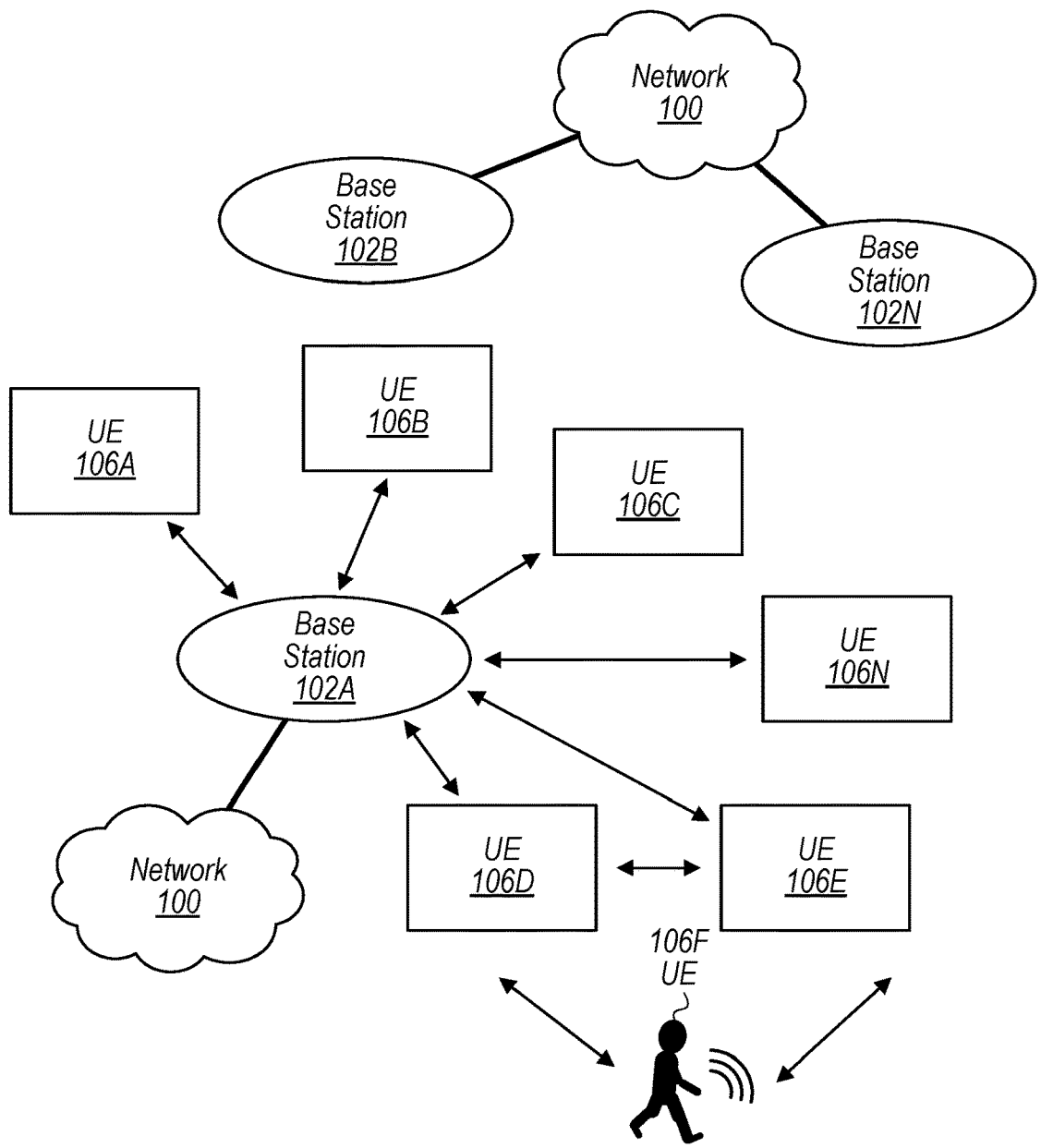
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge
APR: Applications Processor
AUL: Autonomous Uplink Transmission
BLER: Block Error Rate
BS: Base Station
BSR: Buffer Status Report
BWP: Bandwidth Part
CAPC: Channel Access Priority Class
CG: Configured Grant
CMR: Change Mode Request
CORESET: Control Channel Resource Set
COT: Channel Occupancy Time
CRC: Cyclic Redundancy Check
CS-RNTI: Configured Scheduling Radio Network Temporary Identifier
CSI: Channel State Information
DCI: Downlink Control Information
DG: Dynamic Grant
DL: Downlink (from BS to UE)
DMRS: Demodulation Reference Signal
DYN: Dynamic
ED: Energy Detection
FDM: Frequency Division Multiplexing
FT: Frame Type
GC-PDCCH: Group Common Physical Downlink Control Channel
GPRS: General Packet Radio Service
GSM: Global System for Mobile Communication
GTP: GPRS Tunneling Protocol
HARQ: Hybrid Automatic Repeat Request
IR: Initialization and Refresh state
LAN: Local Area Network
LTE: Long Term Evolution
MAC: Media Access Control
MAC-CE: MAC Control Element
MCS: Modulation and Coding Scheme
MIB: Master Information Block
MIMO: Multiple-In Multiple-Out
NDI: New Data Indication
OFDM: Orthogonal Frequency Division Multiplexing
OSI: Open System Interconnection
PBCH: Physical Broadcast Channel
PDCCH: Physical Downlink Control Channel
PDCP: Packet Data Convergence Protocol
PDN: Packet Data Network
PDSCH: Physical Downlink Shared Channel
PDU: Protocol Data Unit
PRB: Physical Resource Block
PUCCH: Physical Uplink Control Channel
PUSCH: Physical Uplink Shared (data) Channel
QCL: Quasi Co-Location
RACH: Random Access Procedure
RAT: Radio Access Technology
RB: Resource Block
RE: Resource Element
RF: Radio Frequency
RMSI: Remaining Minimum System Information
RNTI: Radio Network Temporary Identifier
ROHC: Robust Header Compression
RRC: Radio Resource Control
RS: Reference Signal (Symbol)
RSI: Root Sequence Indicator
RTP: Real-time Transport Protocol
RV: Redundancy Version
RX: Reception/Receive
SDM: Spatial Division Multiplexing
SID: System Identification Number
SGW: Serving Gateway
SR: Scheduling Request
SRS: Sounding Reference Signal
SS: Search Space
SSB: Synchronization Signal Block
TBS: Transport Block Size
TCI: Transmission Configuration Indication
TDM: Time Division Multiplexing
TRS: Tracking Reference Signal
TX: Transmission/Transmit
UCI: Uplink Control Information
UE: User Equipment
UL: Uplink (from UE to BS)
UMTS: Universal Mobile Telecommunication System
Wi-Fi: Wireless Local Area Network (WLAN) RAT based on the Institute of Electrical and Electronics Engineers' (IEEE) 802.11 standards
WLAN: Wireless LAN

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™ Microsoft XBox™, etc.), portable gaming devices (e.g., Nintendo DS™, PlayStation Portable™, Gameboy Advance™, iPod™), laptops, wearable devices (e.g. Apple Watch™ Google Glass™), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
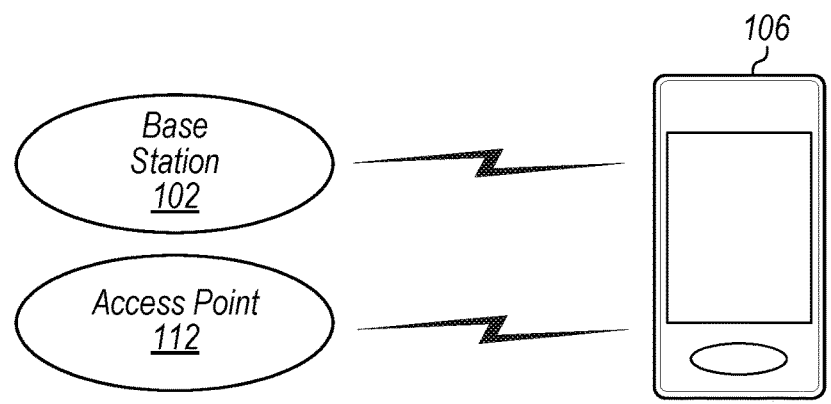
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may operate using configured grants as disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if a base station(s) 102 are implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station (s) 102 may implement configured grants, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-102N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE(s) 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UEs 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

Furthermore, as also illustrated in FIG. 1, at least some of the UE(s) 106, e.g. 106D and 106E may represent vehicles communicating with each other and with base station 102A, via cellular communications such as 3GPP LTE and/or 5G-NR for example. In addition, UE 106F may represent a pedestrian who is communicating and/or interacting with the vehicles represented by UEs 106D and 106E in a similar manner. Further aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
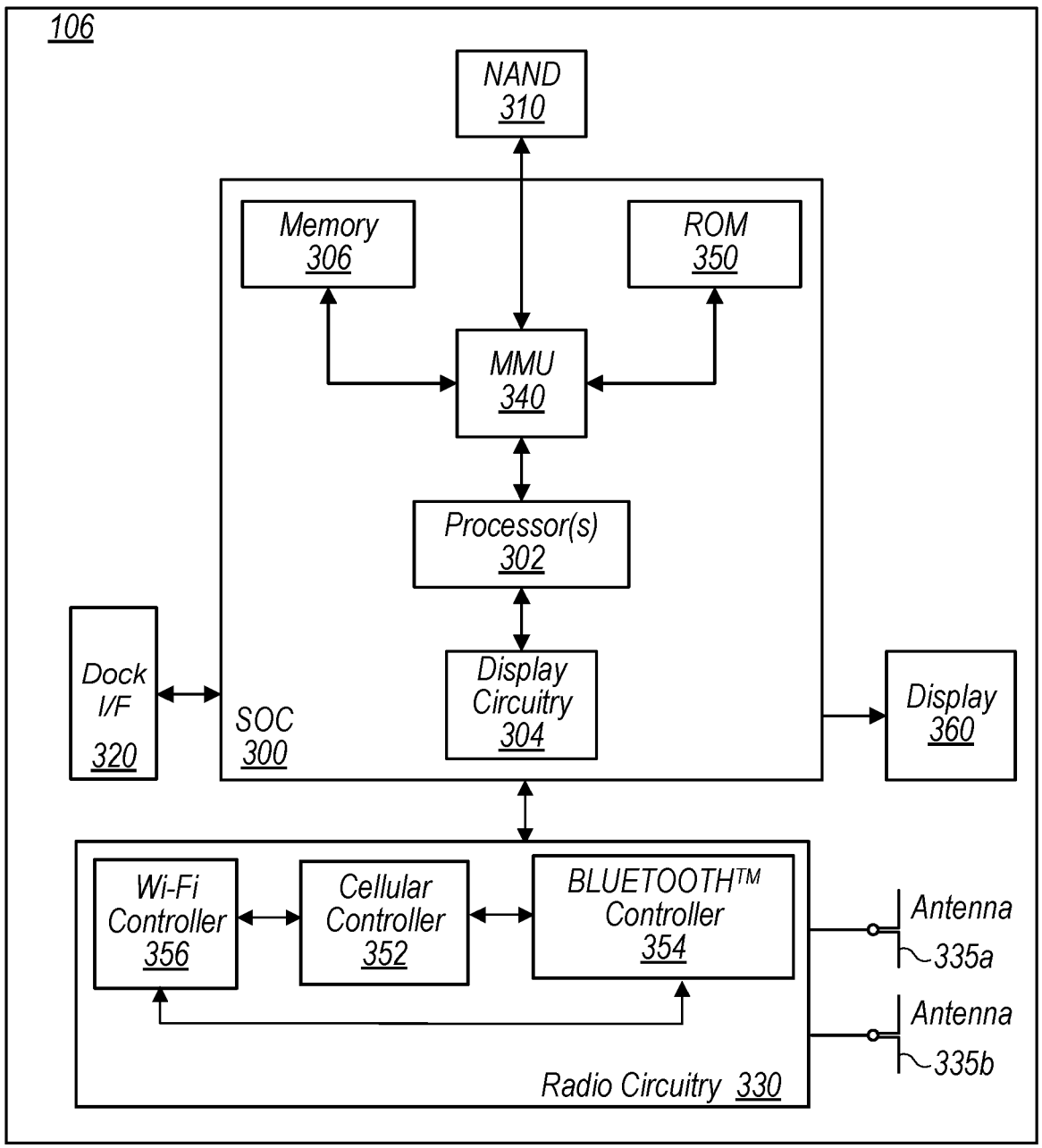
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station(s) 102) may include hardware and software components for operating using control signaling that enhances physical control channel (e.g. PDCCH) transmission and reception, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement configured grants according to various embodiments disclosed herein. Processor(s) 302 may also implement various other applications and/or end-user applications running on UE 106.

Figure 5:
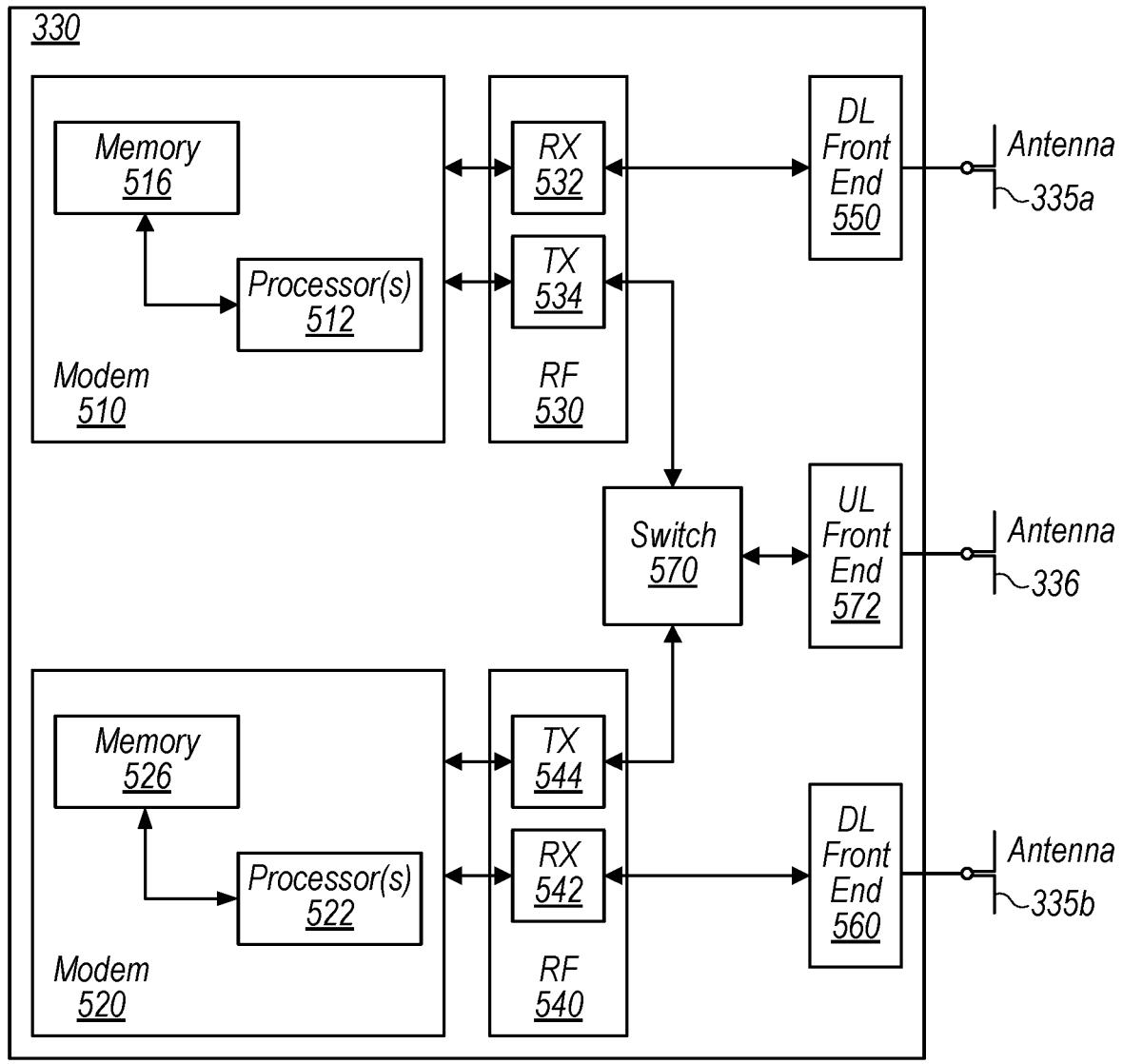
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 and will be further described below.

Figure 4:
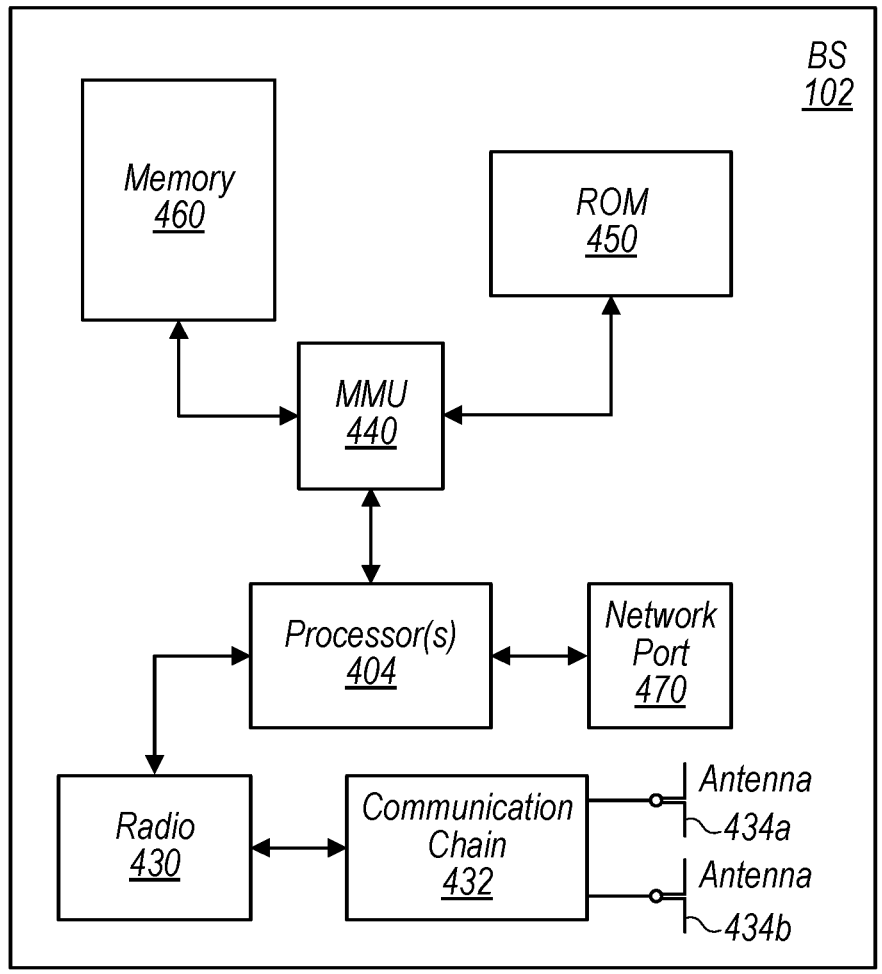
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434*a* and 434*b*) for performing wireless communication with mobile devices and/or other devices. Antennas 434*a* and 434*b* are shown by way of example, and base station 102 may include fewer or more antennas. Overall, the one or more antennas, which may include antenna 434*a* and/or antenna 434*b*, are collectively referred to as antenna (s) 434. Antenna(s) 434 may be configured to operate as a wireless transceiver and may be further configured to communicate with UE devices 106 via radio circuitry 430. The antenna(s) 434 may communicate with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to implement configured grants, as disclosed herein. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein to implement configured grants.

FIG. 5—Block Diagram of Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335*a-b* and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Configured Grants

As previously mentioned, in order to prevent waste of periodically allocated resources, multiple devices may share periodic resources through a configured grant (CG), which the base station uses to allocate configured grant resources to multiple devices. By assigning the configured grant resources, the network (e.g. via the base station) eliminates the packet transmission delay for a scheduling request procedure while also increasing the utilization ratio of allocated periodic radio resources. There are currently two types of CGs, Type 1 CG and Type 2 CG. In case of a Type 1 CG an uplink grant is configured via RRC and stored as a configured uplink grant. In case of a Type 2 CG an uplink grant is configured via PDCCH (addressed to CS-RNTI), and stored or cleared as a configured uplink grant based on Layer 1 signaling indicating configured uplink grant activation or deactivation. Multiple CG configurations may be configured in one BWP of a serving cell, and multiple configurations may be active simultaneously on different serving cells. For Type 2 CG, activation and deactivation may be independent among the serving cells. For the same serving cell, the media access control (MAC) entity may be configured with either Type 1 CG or Type 2 CG.

The information element (IE) for CG includes a number of parameters/parameter values for configuring the CG. Present implementation of CGs is described, for example, in the standards document 3GPP TS 38.331 Rel-16 (38.331 g10). Various embodiments disclosed herein propose the inclusion of additional and/or modified parameters in the CG IE, and further propose additional and/or modified signaling for more efficient configuring of CGs as will be further described below.

CG Uplink Control Information (CG-UCI) in NR Unlicensed Spectrum (NR-U)

Present implementations of CG-UCI in NR-U include at least the following information:
Hybrid Automatic Repeat Request (HARQ) identification (ID);
New Data Indicator (NDI);
Redundancy Version (RV); and Channel Occupancy Time (COT) sharing information.

Additional information to be included in future implementations is under consideration for further study, for example the inclusion of a UE ID.

CG-UCI is included in every CG-PUSCH transmission. In order to determine the number of REs used for CG-UCI, the mechanism of beta-offset for HARQ-ACK on CG-PUSCH (e.g. as it appears in Rel-15 NR of the 3GPP Standard) is being (re)used. A new RRC parameter to configure the beta-offset for CG-UCI has been defined. Accordingly, for a UE-initiated COT sharing indication, when an Energy Detection (ED) threshold is configured, the Channel Access Priority Class (CAPC) value is also indicated in CG-UCI. RRC configuration can be provided to the UE, indicating whether to multiplex CG-UCI and HARQ-ACK. When configured for multiplexing, in case the PUCCH overlaps with CG-PUSCH(s) within a PUCCH group, the CG-UCI and HARQ-ACK are jointly encoded (CG-UCI is treated as the same type as a HARQ-ACK). When not configured for multiplexing, in case the PUCCH overlaps with CG-PUSCH(s) within a PUCCH group and the PUCCH carries a HARQ ACK feedback, a configured grant PUSCH is skipped.

Autonomous Uplink UCI (AUL-UCI)

The immediate availability of UL time-frequency resources for transmission of new data is a key factor in reducing latency and improving UL throughput. This is particularly important for unlicensed spectrum operation where access to the channel may be subject to a Listen-Before-Talk (LBT) procedure, and scheduling UL transmissions with a preceding DL transmission may be inefficient. Autonomous UL (AUL) transmissions, e.g. in unlicensed spectrum, allow UEs to perform UL transmissions without requiring a prior scheduling request or an explicit scheduling grant from the network (e.g. from a base station such as a gNB.)

Present implementations of AUL-UCI include at least the following information:

HARQ ID (4 bits);
NDI (1 bit for TM1, 2 bits for TM2);
RV (2 bits);
UE ID (16 bits);
PUSCH starting point (1 bit: indicating symbol 0 or 1);
PUSCH ending point (1 bit: indicating symbol 12 or 13);
COT Sharing indication (1 bit: indicating whether subframe n+X is an applicable subframe for UL to DL sharing); X is configured by the base station as part of AUL RRC configuration and $1<X<5$; if the UE indicates a subframe as being applicable for UL to DL COT sharing, the UE stops its AUL PUSCH transmission in the preceding subframe at symbol #12 irrespective of the RRC configuration for the PUSCH ending symbol; and
CRC (16 bits).

Potential Issues Arising from the Use of CGs

Figure 6:
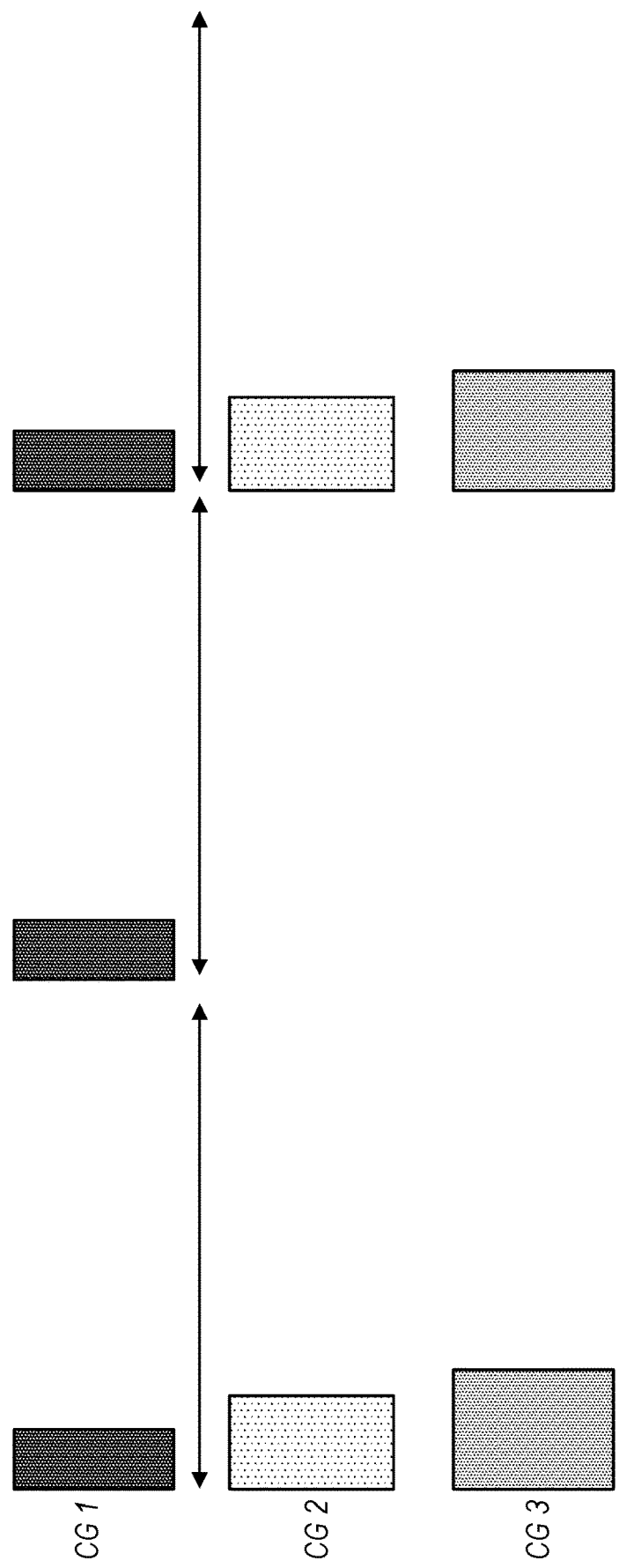
FIG. 6 shows an exemplary diagram illustrating the provisioning of a combined configured grant (CG) for combined traffic of multiple streams, according to some embodiments.

As currently defined (e.g. in Rel-16 NR of the 3GPP Standard), multiple CGs are supported on a Bandwidth Part (BWP), and dynamic Grants (DGs) are still allowed to override a CG timeline. If there are multiple UL traffic streams, for example video traffic for stream 1 and audio traffic for stream 2, the different streams may have different arrival periodicities and different packet sizes while still having very similar reliability requirements (e.g. $10^{-4}$ for Block Error Rate—BLER for the first transmission). Hence when traffic arrivals from both streams take place in the same slot, ideally they would be combined and carried in the same PUSCH (e.g. for better time diversity, sharing DMRS overhead, and/or achieving better channel estimation with the same overhead, etc.) As it stands, however, no suitable solutions exist excepting the provisioning of another CG for the combined traffic as shown in FIG. 6. As shown in FIG. 6, CG 1, CG 2, and CG 3 all occur separately. In addition, as the base station (e.g. gNB) may not have the complete information for the uplink traffic flows to properly configure every CG, some adaptation in the CG may be useful, e.g. actions autonomously and dynamically taken by the UE, for example to best adapt to current network traffic. Configuring many CGs may also lead to base station scheduling restrictions, as the dynamic grant (DG) timeline is still expected to override the CG timeline. It should be noted that DG in this context refers to dynamic scheduling using scheduling requests as previously discussed.

It may be beneficial to maximize the autonomy a UE may have over uplink transmission, especially for unlicensed spectrum access. With the DG (or Scheduling Request—SR scheduling) paradigm, three steps are typically required for a UE to perform an UL transmission, and each step is conditional on acquiring channel access by the transmitter or through the transmitter sharing a COT gained by another node. In a first step, a UE transmits an SR to the base station (alternately the UE may send a Buffer Status Report—BSR to the base station) to indicate data arrival/status. In a second step, the base station transmits a PDCCH to the UE to schedule an uplink transmission. In a third step, the UE transmits the UL data via PUSCH. In contrast to the DG paradigm, in case of a CG the UE is not required to perform the first two steps above, implementing the third step. As previously noted, the CG-UCI design, which was initially introduced in AUL-UCI and subsequently expanded to NR-U, incorporates benefits from both the SR-based approach and SPS-based approach. In one sense, a CG-UCI may be treated as a counter-part of PDCCH in that it makes provisions for the recipient node to receive information necessary to decode the sent transmission.

Enhanced CGs

In order to further improve CGs, the footprint of an uplink transmission of a UE may be (at least partially) defined by the occupied transmission time, the occupied transmission frequency and the transmission power. The CG's footprint may thus be dynamically adjustable/selectable by the UE within defined limits according to the current traffic needs of the UE, and the UE may indicate the actual footprint parameters/values to the base station. In other words, a footprint for uplink data transmissions of the UE may be defined, and the footprint may be selected/determined (or adjusted) by the UE within limits of the footprint previously signaled by the base station (e.g. by gNB) to the UE. The adjustment/selection may further be made at least according to current traffic needs of the UE. The UE may signal the actual footprint to the base station as part of CG uplink control information (CG-UCI) on resources that were configured at least according to UCI transmission parameters also previously signaled to the UE by the base station.

Therefore, on the network side, the base station (e.g. gNB) may configure a maximum allowable footprint by setting limits for corresponding parameters that at least partially define the footprint. The base station may also indicate transmission parameters for configuring resources on which the UE is to transmit the UCI. The UE may autonomously choose the parameter values for the uplink data (e.g. PUSCH) transmission according to parameter range/limit values previously signaled by the base station, basing the selection of the actual values at least partially on the current traffic need of the UE. The parameter values for the PUSCH transmission may carried in the UCI as UCI's payload. For example, if the UE selects certain parameters for the PUSCH transmission, then such parameters may be indicated in the UCI payload to the base station. In some embodiments, a baseline design may include fixed transmission parameters for transmission of the UCI, so the base station does not try different UCI transmissions for the current configured grant. In some embodiments, as a further variation, the transmission parameters for transmission of the UCI may also be allowed to change. For example, multiple sets of such parameters may be indicated by the base station to the UE, and the UE may be enabled to select one of those sets of parameters from among the multiple sets. In such cases the base station may perform blind detection to identify the UCI transmission that is taking place according to the selected set of parameters. Pursuant to the above, CGs may be implemented as follows, according to some embodiments.

Configuration by the Base Station Via RRC or Via RRC and Dynamic Signaling

First, certain sets of parameters may be signaled by the base station to the UE to set up (or to configure) the CG. For a type 1 CG, all transmission parameters may be signaled through RRC signaling, while for a type 2 CG some transmission parameters may be signaled through RRC signaling while some transmission parameters are signaled through dynamic signaling (i.e. in the DCI). It should be noted that for ease of understanding only those parameters pertaining to the above mentioned transmission footprint as implemented in improved CG procedures will be listed below. Additional parameters, not shown, may be indicated by the base station to the UE as necessary for configuring a CG. The parameters explicitly shown herein include those parameters used in allowing the selection of the uplink data transmission (e.g. PUSCH) transmission footprint by the UE as previously described above.

Pursuant to the above, the following sets of parameters may be signaled by the base station to the UE when configuring a CG.

Set A parameters: Parameter ranges/limits for uplink data transmissions, e.g. for PUSCH:
  Maximum transmission duration (Dmax);
  Maximum transmission power;
  MCS level range (e.g. bounded by MCS level A and MCS level B); and
  Maximum occupied frequency (e.g. bounded by $f_{start}$ and $f_{end}$).
Set B parameters: Transmission parameters for transmission of UCI:
  Modulation order (or coding rate if modulation scheme is fixed to QPSK);
  Time and frequency resource (REs); and
  DMRS configuration.

The UE may then autonomously choose/select/determine parameters as follows, while honoring the ranges/limits included in the Set A parameters received by the UE from the base station. The UE may transmit the following set of parameters to the base station as part of the UCI (e.g. CG-UCI) transmitted by the UE to the base station.

Set C parameters: Transmission parameters for PUSH (for uplink data, which is distinct from UCI):
  Transmission duration of each repetition (L);
  Number of repetitions (K);
  MCS level (M); and
  Occupied frequency (e.g. bounded by $f_1$ and $f_2$).
Set C may be selected/determined by the UE at least partially based on the present wireless traffic needs of the UE, and according to the set A parameters received from the base station. The MCS level 'M' may be selected such that MCS level A≤M≤MCS level B, the values of 'K' and 'L' may be selected such that K*L≤Dmax, and finally, $f_1$ and $f_2$ may be selected such that $f_{start} \le f_1 \le f_2 \le f_{end}$. The MCS level may represent CG-UCI MCS levels (or CG-UCI candidate MCS levels) and may be considered a counterpart to PDCCH candidates. As mentioned above, multiple different sets of set B parameters may be indicated to the UE with the UE selecting one of those sets to configure resources on which to transmit the UCI, and the base station may perform blind decoding to detect the UCI transmission of interest, similar to blind decoding PDCCH. The above thus include resource allocations for CG-UCI (time frequency resources), and candidate locations for CG-UCI. As an example, in some embodiments the CG-UCI signaled by the UE to the base station may include the following parameters, with the newly included set C parameters indicated as applicable:

HARQ ID (e.g. 4 bits);
  NDI;
  RV (e.g. 2 bits);
  MCS level (as part of set C parameters shown above);
  Time domain resource indication (e.g. K,L, as part of set C parameters shown above);
  Frequency occupancy information (e.g. starting symbol, number of PRBs, as part of set C parameters shown above);
  COT Sharing indication for the PUSCH ending symbol; and
  CRC (XXX bits) masked by the UE ID.

Figure 7:
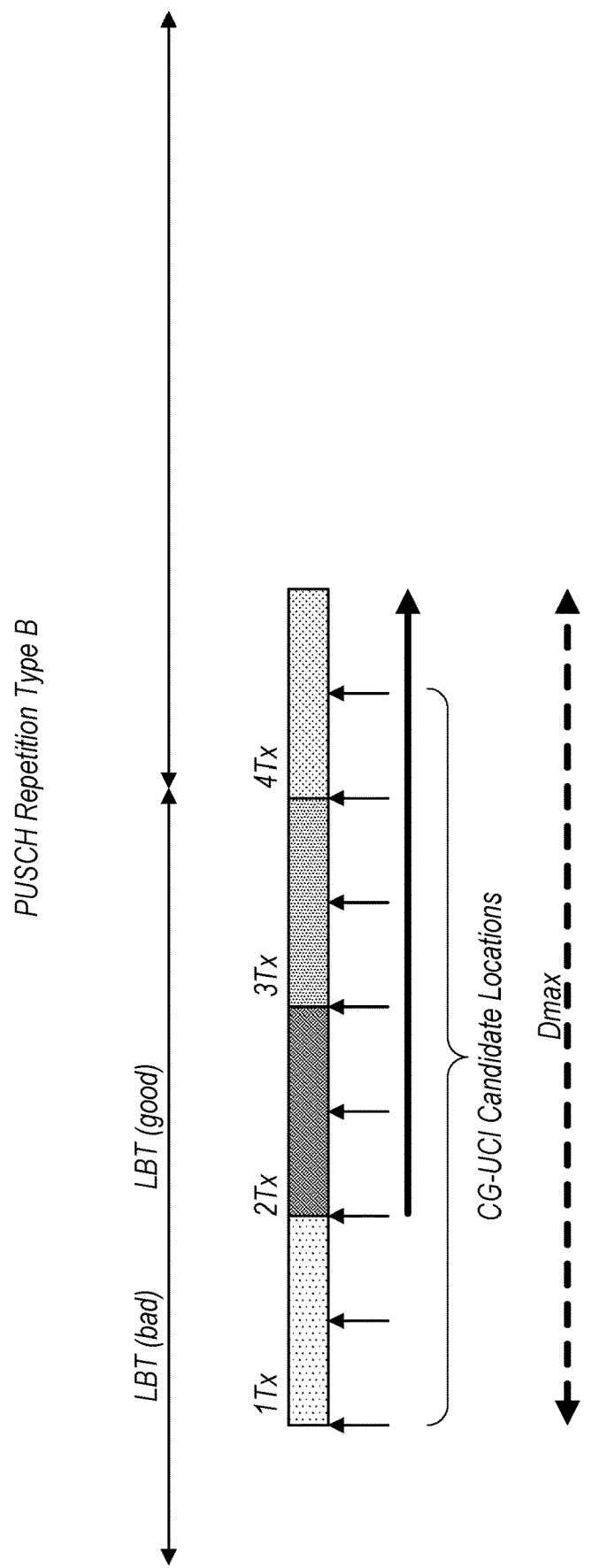
FIG. 7 shows a diagram illustrating CG-UCI candidate locations during a PUSCH repetition type B transmission, according to some embodiments.

In some embodiments, CG-UCI may be carried in fixed candidate locations (e.g., the payload size of CG-UCI, and the frequency/time duration of CG-UCI may be fixed if present) as indicated by the vertical arrows in FIG. 7, which illustrates CG-UCI transmission for PUSCH Repetition Type B. The MCS level may be fixed for CG-UCI. The implementation of a footprint as described above may facilitate blind detection on the base station (e.g. gNB) side as necessary, in case UCI transmission resources may be selectable by the UE. It may also allow multiple CG-UCI candidates with different coding rates, similar to PDCCH with different aggregation levels. The CG-UCI may have its own Demodulation Reference Signal (DMRS) to facilitate base station decoding without relying on the DMRS of PUSCH data (or data transmitted on/via the PUSCH.)

TBS Determination and Adjustable MCS Level and {L,K}

The TBS size may be determined according to {MCS level, L, and number of PRBs in a nominal repetition}, and one or more of them may be signaled to the base station. The allowable MCS levels do not have to span the full range supported in NR, e.g. the base station may configure several allowed MCS levels, or as a range (MCS delta range as indicated above with respect to set A parameters) around the signaled/configured MCS level. As an example, with a Type 2 CG, if MCS=5 is signaled to the UE along with an MCS delta range of 2, then the UE may choose from among the following MCS levels: 3, 4, 5, 6, 7 (3, 4 and 6, 7 are all within the delta range of 2 of the signaled value of 5.)

With PUSCH repetition Type B, L (the number of OFDM symbols in a nominal repetition) may be a factor in determining the TBS. By making L adjustable, the UE may configure the current transmission according to the traffic need, for example to carry packets for audio and video streams in one PUSCH. In another example, for a video codec, the payload of a reference frame may be set to be different from the payload of a residual frame for a video stream.

With PUSCH repetition type B, the base station may also configure the maximum duration, Dmax, for a CG transmission bundle. The UE may be free to choose L (for a single TX) and K (the repetition factor) as long as K×L<=Dmax (e.g. constrained within the maximum allowable footprint.)

Frequency Occupancy and UCI/Data Multiplexing

The starting PRB and the number of PRBs in the PUSCH transmission may be signaled by the UE. To reduce signaling overhead, the starting PRB may be constrained to be the same as the lowest PRB corresponding to the CG-UCI.

In case of CP-OFDM (cyclic prefix OFDM), for rank 1 transmission the number of PRBs occupied by the CG-UCI may be assumed to be different from that of PUSCH, with the remaining REs on a symbol with CG-UCI populated with PUSCH. For rank 2 or higher rank transmission, the same CG-UCI may be applied for each spatial layer, and the precoding may be up to implementation by the UE. One example for CP-OFDM is provided in FIG. 8 (802).

In case of DFT-S-OFDM, to avoid different TX power levels across time, it may be preferable to have the rest of PUSCH following after the CG-UCI. One example for DFT-S-OFDM is provided in FIG. 8 (804).

Figure 8:
FIG. 8 shows diagrams illustrating frequency occupancy for cyclic prefix OFDM transmissions and DFT-S-OFDM transmissions of CG-UCI, respectively, according to some embodiments.

As shown in FIG. 8, the new CG-UCI may occupy orthogonal resources with respect to PUSCH REs, hence the UCI multiplexing rules may also be changed, for example similar to what is done for two stage SCI (Sidelink Control Information) design in V2X. In this sense CG-UCI may be considered to play a role similar to stage 1 SCI.

UCI/Data Multiplexing for Different Repetitions

Figure 9:
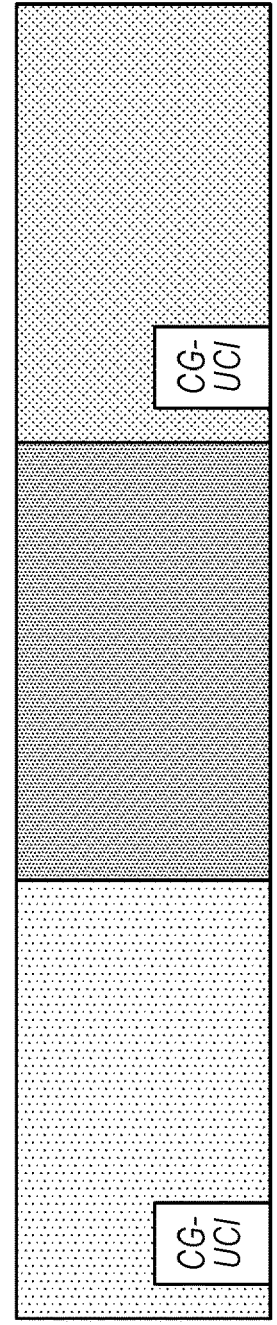
FIG. 9 shows frequency occupancy for CG-UCI transmissions with CG-UCI present in some repetitions but not others, according to some embodiments.

In the current NR-U design, CG-UCI is carried in each PUSCH transmission, which is a reasonable design considering the transmission duration does not change. In contrast, according to various embodiments disclosed herein, since L may be adjusted and CG-UCI may be present on fixed locations, CG-UCI may be present in some repetitions but not in others, as illustrated in FIG. 9, for example.

Power Control

Power control may be determined according to {MCS level, and number of PRBs in a nominal repetition}. As a baseline solution, the MCS level for PUSCH transmission may be selected by the UE, and the transmission power may also be adjusted accordingly. More elaborate solutions are also possible and are contemplated. The base station may define a maximum power level, which may be provided as an absolute limit, e.g. in dBm, or it may be a relative power margin, e.g. in dB. The UE may operate such that it does not exceed that power margin/absolute limit. In some embodiments, the restriction may be provided as a limit over total transmission power or a limit over PSD. In unlicensed spectrum there may be a PSD limit due to regulatory requirements, while the base station may enforce a PSD limit to ensure inter-cell interference is not too severe.

Configuring CGs in a UE

Figure 10:
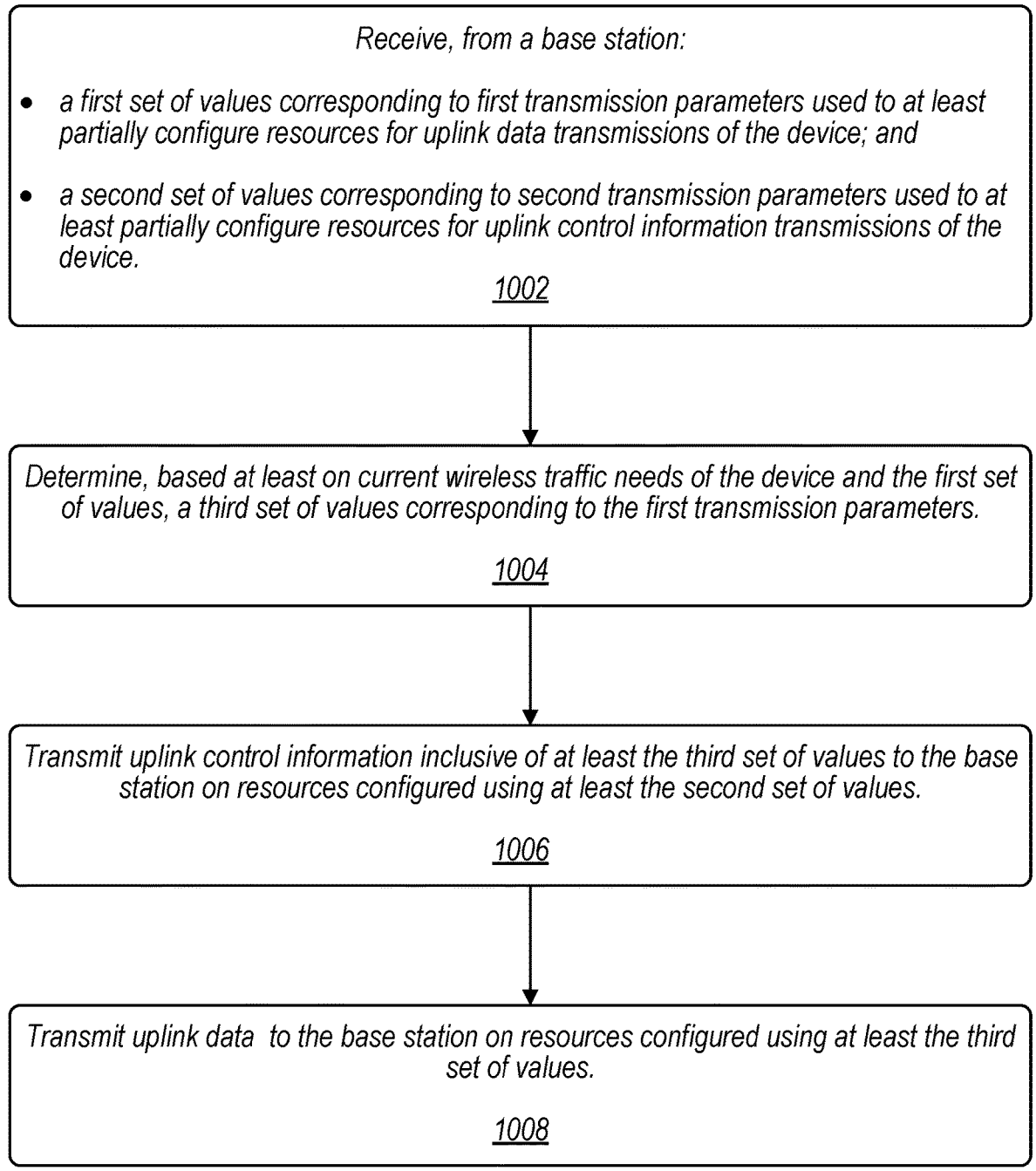
FIG. 10 shows a flow diagram of an exemplary method for a mobile device implementing a CG, according to some embodiments.

FIG. 10 shows a flow diagram of an exemplary method for a mobile device implementing a CG, according to some embodiments. As shown in 1002, the device may receive from a base station a first set of values corresponding to first transmission parameters used to at least partially configure resources for uplink data transmissions of the device (e.g. transmission parameters for PUSCH transmission by the device), and may also receive from the base station a second set of values corresponding to second transmission parameters used to at least partially configure resources for uplink control information transmissions of the device (e.g. transmission parameters for UCI transmission by the device.) In 1004, the device may determine, based at least on current wireless traffic needs of the device and the first set of values, a third set of values corresponding to the first transmission parameters. In 1006, the device may transmit uplink control information, inclusive of at least the third set of values, to the base station on resources configured using at least the second set of values. In 1008, the device may transmit uplink data to the base station on resources configured using at least the third set of values.

Configuring CGs by a Base Station

Figure 11:
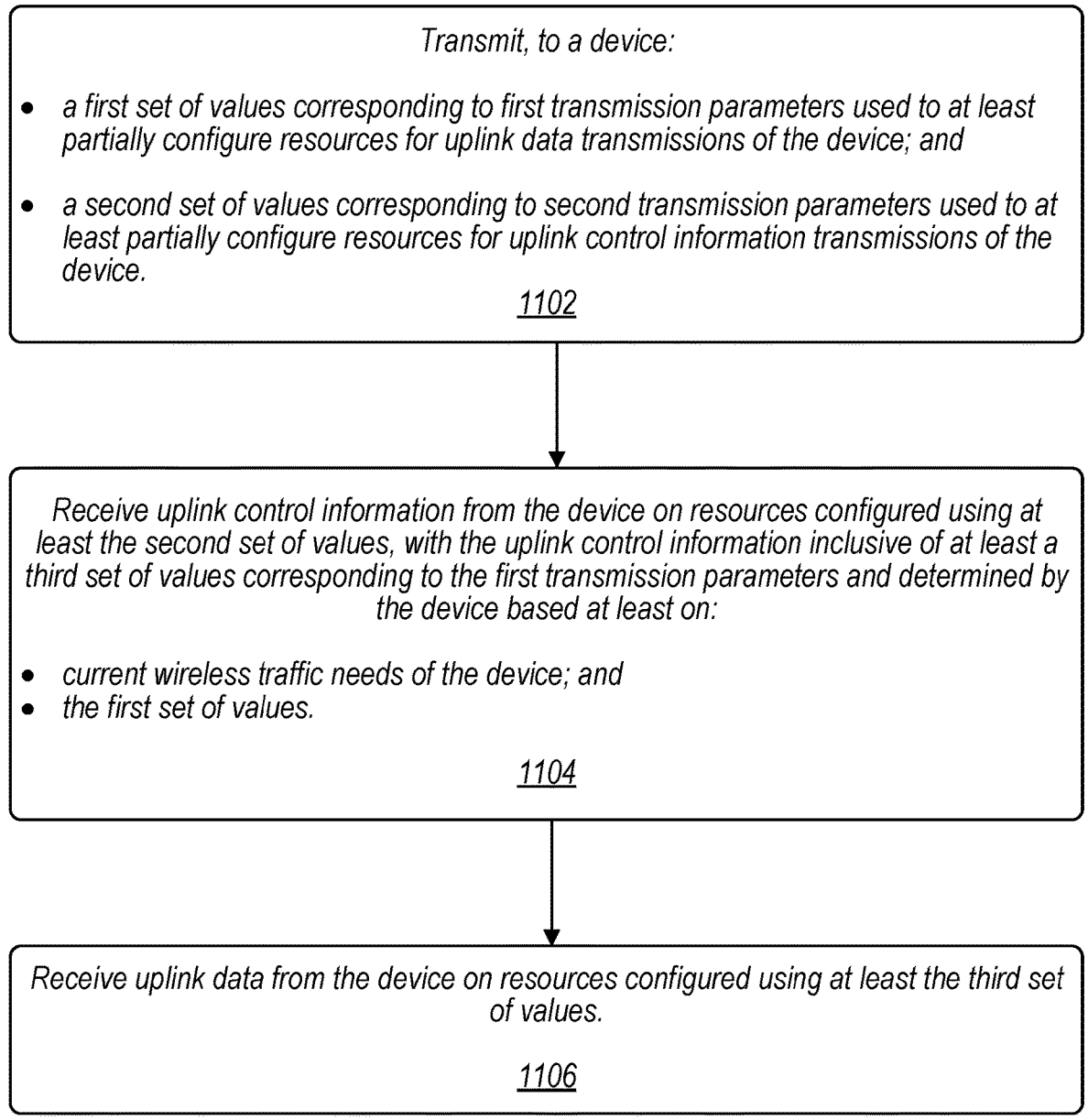
FIG. 11 shows a flow diagram of an exemplary method for a base station implementing a CG, according to some embodiments.

FIG. 11 shows a flow diagram of an exemplary method for a base station implementing a CG, according to some embodiments. As shown in 1102, the base station may transmit configuration parameters/values to a device as part of configuring a CG for the device. The base station may accordingly transmit a first set of values corresponding to first transmission parameters used to at least partially configure resources for uplink data transmissions of the device (e.g. transmission parameters for PUSCH transmission by the device), and may further transmit to the device a second set of values corresponding to second transmission parameters used to at least partially configure resources for uplink control information transmissions of the device (e.g. transmission parameters for UCI transmission by the device.) In 1104, the base station may receive uplink control information from the device on resources configured using at least the second set of values, with the uplink control information inclusive of at least a third set of values corresponding to the first transmission parameters and determined by the device based at least on current wireless traffic needs of the device and the first set of values. In 1106, the base station may receive uplink data from the device on resources configured using at least the third set of values.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) or device may be the basis of a corresponding method for operating a base station or appropriate network node, by interpreting each message/signal X received by the UE in the downlink as message/signal X transmitted by the base station/network node, and each message/signal Y transmitted in the uplink by the UE as a message/signal Y received by the base station/network node.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor configured to perform operations comprising:
   receiving, from a base station, values limits corresponding to first transmission parameters used to at least partially configure resources for uplink data transmissions of a device;
   receiving, from the base station, a first set of values corresponding to second transmission parameters used to at least partially configure resources for uplink control information transmissions of the device;
   determining, based at least on current wireless traffic needs of the device, a second set of values corresponding to the first transmission parameters within the value limits; and
   transmitting, to the base station on resources configured according to at least the first set of values, uplink control information comprising at least the second set of values.

2. The baseband processor of claim 1 configured to perform further operations comprising:
   transmitting, to the base station, uplink data on resources configured according to at least the second set of values.

3. The baseband processor of claim 1, wherein the value limits include respective limits for limiting a corresponding value of each of the first transmission parameters.

4. The baseband processor of claim 1, wherein the value limits and the first set of values are received as part of configuration information of a configured grant.

5. The baseband processor of claim 1, wherein the second set of values comprises one or more of:
   transmission duration of each repetition;
   number of repetitions;
   modulation coding scheme level;
   occupied frequency; or
   cyclic redundancy check bits masked by the device.

6. The baseband processor of claim 1, wherein the value limits comprise one or more of:
   maximum transmission duration;
   maximum transmission power;
   modulation coding scheme level range; or
   maximum occupied frequency.

7. The baseband processor of claim 1, wherein the second transmission parameters comprise one or more of:
   modulation order;
   coding rate;
   time and frequency resource elements; or
   demodulation reference signal configuration.

8. A device comprising:
   radio circuitry configured to facilitate wireless communications of the device; and
   a processor communicatively coupled to the radio circuitry and configured to perform operations comprising:
      receiving, from a base station, value limits corresponding to first transmission parameters used to at least partially configure resources for uplink data transmissions of a device;
      receiving, from the base station, a first set of values corresponding to second transmission parameters used to at least partially configure resources for uplink control information transmissions of the device;
      determining, based at least on current wireless traffic needs of the device, a second set of values corresponding to the first transmission parameters within the value limits; and
      transmitting, to the base station on resources configured according to at least the first set of values, uplink control information comprising at least the second set of values.

9. The device of claim 8, wherein the processor is configured to perform further operations comprising:
   transmitting, to the base station, uplink data on resources configured according to at least the second set of values.

10. The device of claim 8, wherein the value limits include respective limits for limiting a corresponding value of each of the first transmission parameters.

11. The device of claim 8, wherein the value limits and the first set of values are received as part of configuration information of a configured grant.

12. The device of claim 8, wherein the second set of values comprises one or more of:
   transmission duration of each repetition;
   number of repetitions;
   modulation coding scheme level;
   occupied frequency; or
   cyclic redundancy check bits masked by the device.

13. The device of claim 8, wherein the value limits comprise one or more of:
   maximum transmission duration;
   maximum transmission power;
   modulation coding scheme level range; or
   maximum occupied frequency.

14. The device of claim 8 wherein the second transmission parameters comprise one or more of:
   modulation order;
   coding rate;
   time and frequency resource elements; or
   demodulation reference signal configuration.

15. A non-transitory memory element storing instructions executable by a processor to perform operations comprising:
   receiving, from a base station value limits corresponding to first transmission parameters used to at least partially configure resources for uplink data transmissions of a device;
   receiving, from the base station, a first set of values corresponding to second transmission parameters used to at least partially configure resources for uplink control information transmissions of the device;
   determining, based at least on current wireless traffic needs of the device a second set of values corresponding to the first transmission parameters within the value limits; and
   transmitting, to the base station on resources configured according to at least the first set of values, uplink control information comprising at least the second set of values.

16. The non-transitory memory element of claim 15, wherein the instructions are executable by the processor to perform further operations comprising:
   transmitting, to the base station, uplink data on resources configured according to at least the second set of values.

17. The non-transitory memory element of claim 15, wherein the value limits and the first set of values are received as part of configuration information of a configured grant.

18. The non-transitory memory element of claim 15, wherein the second set of values comprises one or more of:
   transmission duration of each repetition;
   number of repetitions;
   modulation coding scheme level;
   occupied frequency; or
   cyclic redundancy check bits masked by the device.

19. The non-transitory memory element of claim 18, wherein the value limits comprise one or more of:
   maximum transmission duration;
   maximum transmission power;
   modulation coding scheme level range; or
   maximum occupied frequency.

20. The non-transitory memory element of claim 15 wherein the second transmission parameters comprise one or more of:
   modulation order;
   coding rate;
   time and frequency resource elements; or
   demodulation reference signal configuration.

* * * * *

UNITED STATES PATENT AND TRADEMARK OFFICE
CERTIFICATE OF CORRECTION

PATENT NO. : 12,133,232 B2
APPLICATION NO. : 17/442117
DATED : October 29, 2024
INVENTOR(S) : Weidong Yang et al.

It is certified that error appears in the above-identified patent and that said Letters Patent is hereby corrected as shown below:

In the Claims

Column 25, Line 4, delete "values;" and insert --value--.

Signed and Sealed this
Eighteenth Day of March, 2025

Coke Morgan Stewart
*Acting Director of the United States Patent and Trademark Office*